Sept. 10, 1946.           E. H. LAND           2,407,306
RANGE FINDER
Filed March 17, 1943                2 Sheets-Sheet 1

Edwin H. Land
INVENTOR.

BY Donald L. Brown
Attorney

Sept. 10, 1946.  E. H. LAND  2,407,306
RANGE FINDER
Filed March 17, 1943    2 Sheets-Sheet 2

Edwin H. Land
INVENTOR.

BY Donald L. Brown
Attorney

Patented Sept. 10, 1946

2,407,306

UNITED STATES PATENT OFFICE 2,407,306

RANGE FINDER

Edwin H. Land, Cambridge, Mass., assignor to Polaroid Corporation, Cambridge, Mass., a corporation of Delaware Application March 17, 1943, Serial No. 479,404

19 Claims. (Cl. 88—2.7)

1

This invention relates to range finders, and more particularly to stereoscopic range finders.

One object of the invention is to provide a new and improved range finder, comprising means for impressing optical indicia upon the field of view and comprising also means for bringing said indicia into apparent coincidence with the plane of an object in said field and thereby computing the distance of said object from the observer.

Another object is to provide a range finder of the above characteristics capable of viewing the field directly and without lenses, wherein means are provided for directly coupling said optical indicia and said field, and particularly wherein said coupling means comprise transparent mirrors positioned between said indicia-producing means and the observer and which mirrors serve, in combination with other mirrors, to provide an increased stereoscopic effect in viewing the field.

A further object is to provide a range finder of the type outlined wherein the field remains stationary and wherein means are provided for causing apparent motion of said indicia toward and away from the observer with respect to said field.

Still further objects are to provide indicia for the purpose described of a stereoscopic nature, comprising two images each visible to only one eye of the observer; to provide means for predeterminedly altering and controlling the lateral displacement of one of said images with respect to the other; to provide new and improved reticles for use in forming said indicia; to provide said indicia-forming means and the control means therefor within the housing of the range finder; to provide said indicia by means of a single reticle coupled with means for forming a double image thereof; and to provide means for polarizing, and particularly for circularly polarizing, each of the images forming said indicia.

Other objects and advantages will in part be apparent and in part be pointed out in the course of the following description of several embodiments of the invention, which are given as non-limiting examples, in connection with the accompanying drawings, in which:

Fig. 3 is a diagrammatic view in perspective, partly broken away, illustrating certain details of apparatus suitable for use in combination with

Figure 2:
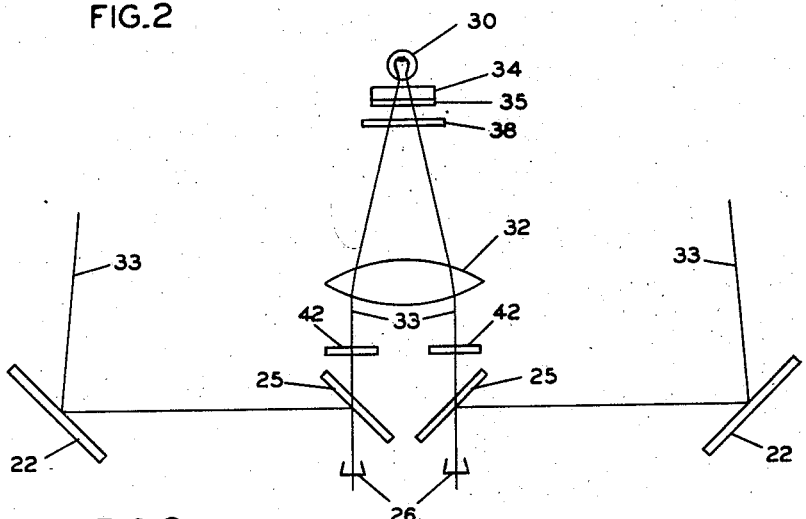
Fig. 2 illustrates diagrammatically and in plan the optical elements employed in an embodiment of the invention.
Figure 3:
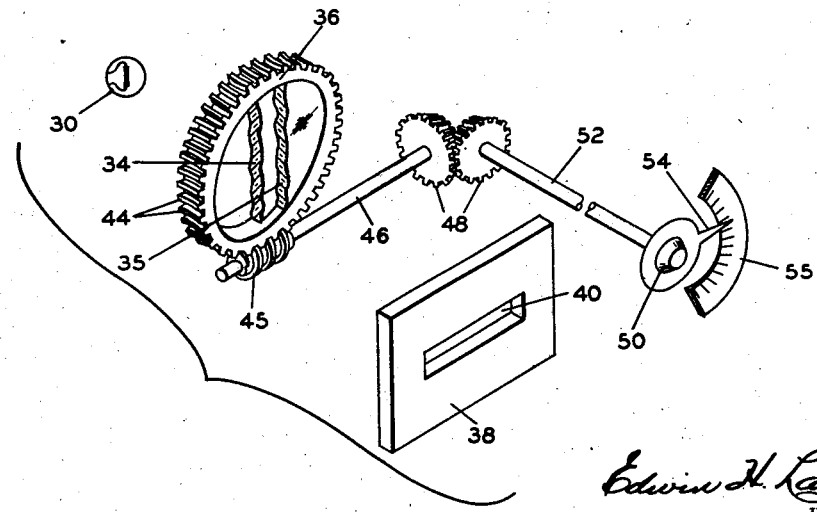
Figure 8:
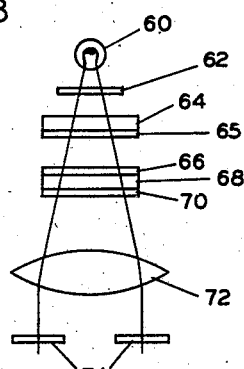
Figure 9:
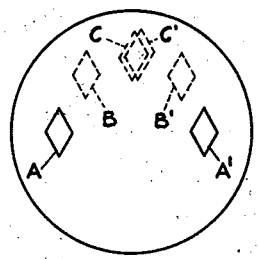
Figure 10:
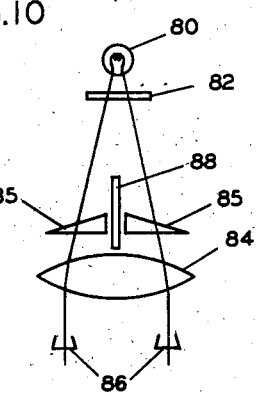
Figure 11:
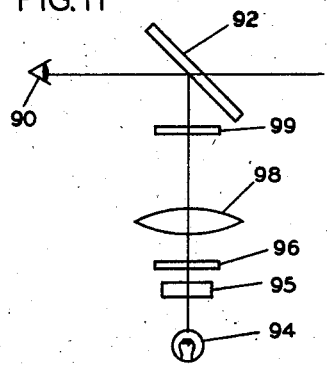

2 the optical system shown in Fig. 2, for producing and controlling the apparent position upon the field of the indicia mentioned heretofore;

Figs. 4–7 are detail views illustrating diagrammatically the operation of the means for producing and controlling said indicia in Figs. 2 and 3;

Fig. 8 is a partial diagrammatic view similar to Fig. 2 illustrating the optical elements employed in a modification of the invention;

Fig. 9 is a diagrammatic view similar to Figs. 4–7 illustrating the operation of the modification of the invention shown in Fig. 8;

Fig. 10 is a view similar to Fig. 8 showing still another modification of the invention; and Fig. 11 is a side view similar to Fig. 2 illustrating diagrammatically a modification of the invention.

In the form of the invention illustrated in Figs. 1–7, housing 20, of any desired size and shape, is provided with a pair of mirrors or other reflecting surfaces 22 adapted to receive light from in front of the instrument through the windows or apertures at 24. This arrangement serves both to provide an effectively enlarged interocular distance or increased stereoscopic effect, and also to limit the field of view to an area substantially in front of the instrument. Associated with mirrors 22 is a pair of transparent mirrors 25. Each of mirrors 25 is adapted to receive light from one of mirrors 22 and to reflect it towards one of eyepieces 26. An observer employing this range finder will look simultaneously through both of eyepieces 26, with the result that his right eye will receive light from right-hand mirrors 22 and 25 and his left eye will simultaneously receive light from left-hand mirrors 22 and 25. It is also to be understood that mirrors 25 and mirrors 22 should be so positioned as to enable an observer employing the instrument to see substantially the same field with each eye. Such a structure, except for the use of transparent mirrors 25 instead of wholly reflecting surfaces, is standard in the construction of range finders of the class of the present invention. Its effect and purpose is to increase the effective interocular distance of the observer by the distance between mirrors 22, and thus to increase considerably the stereoscopic acuity of his vision as applied to the field.

The indicia-forming apparatus of this embodiment of the invention is illustrated particularly in Figs. 2–7, and may conveniently be located within an extended portion 28 of housing 20. It comprises a reticle 30 of any desired type or characteristics and a relatively large lens 32 or other device for collimating the rays from reticle 30 and thus causing the image thereof to appear at infinity when viewed through eyepieces 26 and transparent mirrors 25. In the embodiment of the invention shown in Figs. 2-7, reticle 30 is represented as a vertical line filament positioned at the focal point of lens 32 and illuminated from a suitable source of current (not shown), but it may take many other forms such, for example as an illuminated grid. The term "reticle" as it is used herein and in the claims is to be understood as having the meaning commonly accorded thereto in the range-finder art, and it is to be considered as including any means for producing visible indicia, such for example as a line, a dot, or a circle or other figure or figures, in the optical system of the instrument. Although an artificially illuminated reticle is to be preferred, there may instead be used a translucent element which becomes visible to the observer by reason of the passage of daylight therethrough. Other examples of suitable reticles will be apparent to those skilled in the art or will be described hereinafter, and all are to be construed as coming within the scope of the invention.

It will now be seen that the result of the arrangement of the above described elements is to enable an observer looking through eye-pieces 26 to see the field by means of mirrors 22, and simultaneously to see impressed thereon an image of reticle 30, as is illustrated diagrammatically by ray lines 33 in Fig. 2. There are also provided means for rendering the image of reticle 30 stereoscopic and for altering its apparent position within the field of view. This result is accomplished by means for producing a double image of said reticle, coupled with means for insuring that one of said images is seen only by the right eye of the observer and the other image only by the left eye of the observer, and coupled further with means for altering the lateral displacement of one of said images with respect to the other, so that as the observer views them simultaneously, the result is to cause the apparent position of the resulting stereoscopic image or indicia to move toward him from infinity to some other plane in the field, said plane being determined by the degree of lateral displacement of the two images.

Means for accomplishing the last described results are shown particularly in Figs. 2 and 3, and the operation thereof is illustrated in detail in Figs. 4-7. Element 34 represents a birefringent, uniaxial, double-image-forming element, such for example as a crystal of calcite or equivalent material positioned in the path of rays emanating from reticle 30 and falling upon collimating lens 32. Element 34 is so positioned as to provide two oppositely polarized images of reticle 30. This phenomenon is well known, and, as is also well known, when element 34 is rotated about an axis such as a line passing between the center of lens 32 and its focal point at 30, one of the images of reticle 30, that formed by the ordinary ray, remains fixed, while the other image, that formed by the extraordinary ray, rotates about the first image. A portion of this rotation is illustrated diagrammatically in Figs. 4-7, wherein line A represents the image of reticle 30 formed by the extraordinary ray and line B the image formed by the ordinary ray. If the rotation were complete, each point in image A would pass in a circle about the corresponding point in image B.

The images formed by element 34 are linearly polarized at right angles to each other, and as said element is rotated the direction of vibration of the polarized beams rotates similarly. It is to be preferred, therefore, to provide means for converting the linearly polarized images transmitted by element 34 into circularly polarized images, one image being circularly polarized in a clockwise direction and the other in a counterclockwise direction. This may be accomplished by providing a quarter-wave retardation element 35 positioned between element 34 and lens 32, with its principal vibration direction bisecting the angle between the directions of vibration of the two linearly polarized images transmitted by element 34. Quarter-wave plate 35 may be adhesively bonded to the adjacent face of element 34, or it may be mounted for rotation therewith, as for example in a suitable frame 36. Element 35 need not be in contact with element 34, and may be spaced therefrom if desired, but it should intercept all light traversing element 34 and incident upon lens 32.

It will be apparent from Figs. 4-7 that rotation of element 34 results not only in alteration of the lateral displacement of one of the images of reticle 30 with respect to the other, but also in a vertical displacement of image A formed by the extraordinary ray. It is preferred, therefore, to provide a suitable mask or screen 38, which may be interposed between element 34 and lens 32, in order to limit the observer's view of the images of reticle 30 to such portions thereof as appear to move laterally with respect to each other. Thus in Figs. 4-7, it will be seen that mask 38 is provided with a horizontal slot 40 of such dimension vertically as to block from the view of the observer most of each of the images of reticle 30. The observer sees only such portions of the images that the vertical movement of image A is not apparent since each of said images is identical throughout its length. It will be understood that mask 38 is preferably so arranged and slot 40 of such size that at no time does moving image A fail to overlie completely the width of said slot.

Means are provided for so analyzing the circularly polarized light carrying the two images of reticle 30 that one image is seen only by one eye of the observer and the other image only by his other eye. Said means may comprise circular polarizers, one for each eye of the observer, and may advantageously be unitary elements each comprising a linearly polarizing element having bonded thereto a quarter-wave retardation element having a principal vibration direction thereof at an angle of 45 degrees to the transmission axis of the linear polarizer. In Fig. 2 elements 42 represent such circular polarizers, and it will be understood that in each case said quarter-wave element will be positioned on the side of the linear polarizer adjacent lens 32. One of polarizers 42 will be adapted to block clockwise circularly polarized light, and the other will be adapted to block counter-clockwise circularly polarized light. It is not necessary for the quarter-wave elements in analyzers 42 to be bonded to the linearly polarizing elements. In fact, a single quarter-wave element may be employed, positioned, for example, in slot 40 of mask 38, in which case elements 42 should be understood as illustrating linearly polarizing elements positioned with their axes perpendicular to each other and at angles of 45 degrees to the principal vibration direction of said quarter-wave elements. Polarizers 42 may, moreover, be affixed to the inner faces of transparent mirrors 25, or they may be positioned in any other desired place between mirrors 25 and lens 32.

Figure 4:
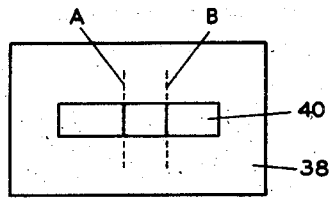
Figure 5:
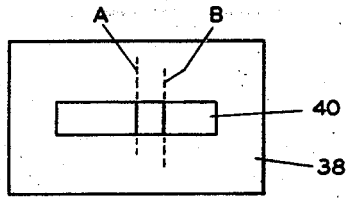
Figure 6:
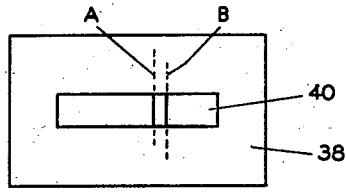
Figure 7:
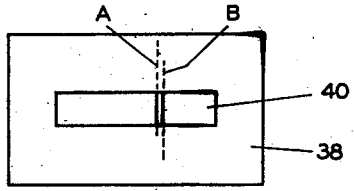

It may be assumed, for purposes of further explanation, that in the above described combination, the right eye of an observer utilizing eyepieces 26 may see image A of reticle 30, while his left eye will see only image B. When images A and B are at their maximum lateral displacement, as represented in Fig. 4, the observer will see the stereoscopic image of reticle 30 superimposed upon the field at the shortest distance from the range finder. This apparent position may be nearer to the range finder than the minimum of the distance for which it is intended the instrument shall be used, but the image will appear to move farther and farther away from the observer as images A and B approach each other, as for example in the intermediate displacements illustrated in Figs. 5 and 6, until, when the two images are substantially superimposed as illustrated in Fig. 7, the stereoscopic image will appear to be at infinity.

Any suitable means may be employed for rotating and controlling elements 34 and 35, and an example of suitable apparatus is shown diagrammatically in Fig. 3. Frame 36, carrying elements 34 and 35, is illustrated as provided on its outer surface with gear teeth 44 meshing with worm gear 45 on shaft 46, which in turn may be controlled through gears 48 and shaft 52. Shaft 52 may extend to a position where a knob 50 may be readily manipulated by the operator of the instrument. It will be seen that with this arrangement, as the operator of the instrument turns knob 50, elements 34 and 35 are rotated to bring about the displacement of the two images of reticle 30 illustrated in Figs. 4–7.

Means are also provided for resolving the extent of the rotation of elements 34 and 35 into an accurate measurement of the distance from the range finder of an object in the plane wherein the stereoscopic image of reticle 30 appears to lie. Fig. 3 shows such means as comprising a pointer 54 and scale 55, said pointer being fixed to knob 50 and shaft 52 for rotation therewith. It will be understood that scale 55 may be mounted in any suitable way on or within housing 20, and it may preferably read in yards and should be so adjusted with respect to pointer 54 that when the two images of reticle 30 are substantially superimposed as represented in Fig. 7, the yardage opposite the pointer will be at a maximum, and when said two images are at their positions of maximum lateral displacement as in Fig. 4, the yardage appearing opposite the pointer on the scale will be a minimum. It will be apparent that gears 44, 45 and 48 may be so designed as to cause relatively slight rotation of elements 34 and 35 with relatively greater rotation of shaft 52, thus making it possible to secure a more sensitive scale.

It is believed that the operation of the above described embodiment of the invention will now be apparent. The operator first adjusts the range finder so that the stereoscopic image of reticle 30 is substantially in line with an object in the field of view whose distance it is desired to determine. The image of the reticle will in all probability appear to be in a different plane from said object, i. e. either in front of or behind it in space. The operator then turns knob 50 until said image appears to lie in the same plane as the object whose range is being measured, and at that point he reads the range directly from scale 55.

It should be pointed out that in use the relation between the apparent position of the stereoscopic reticle image and the field depends largely upon the angular relation of mirrors 22 and 25 and upon the base line of the instrument, i. e. the distance between mirrors 22. If mirrors 25 are at right angles to each other and parallel to their associated mirrors 22, the reticle image will appear to lie at infinity with respect to the field when images A and B are directly superimposed, as illustrated in Fig. 7. If, however, mirrors 25 are at right angles to each other and mirrors 22 are at an angle of less than 90° to each other, or vice versa, the reticle image will appear to lie nearer in space than infinity when images A and B are directly superimposed, and will appear to move still nearer as image A moves to the left in the drawings. It follows, therefore, that if desired elements 34 and 35 may be mounted for 180° of relative rotation, i. e. for rotation through 90° on each side of the position in which the two images of reticle 30 are superimposed. Mirrors 22 and 25 may then be so arranged with respect to each other and the axis of housing 20 that when the two images of the reticle are superimposed, the stereoscopic image formed thereby will appear to be at substantially the midpoint between its apparent position nearest the observer and its apparent farthest position. A more sensitive scale may be obtained in this way, and all such modifications are to be construed as coming within the scope of the invention.

It should be noted that the above described range finder offers a very substantial advantage over range finders of this general type heretofore available, in that it is capable of use at unit magnification without lenses. Lenses of the type which would otherwise be necessary are exceedingly expensive, and even the best such lenses have inherent errors which would affect the accuracy of the instrument. The elimination of lenses materially reduces the cost and weight, as well as the necessary degree of care and adjustment, and thus helps make the present invention particularly adaptable to portable range finders. A further important advantage which derives from the omission of lenses is that the speed of operation of the device is greatly enhanced. Difficulty is frequently encountered in attempting to locate a predetermined object through a lens system, and a separate finder is usually needed. Both of these complications may be eliminated in the present invention.

In the above described embodiment of the invention, the only lens used is collimating lens 32 in Fig. 2, which is relatively large in size, and any errors therein can be substantially compensated for by locating fixed eye positions 26 near the lens, thus limiting the view to a small portion thereof. Furthermore, lens 32 serves only to cause the images of reticle 30 to appear to be at infinity, and any other similarly operating device may be substituted therefor without in any way altering the essentials of the invention. It is to be understood, however, that the present invention is not limited to operation without lenses, and that any desired lens system may be incorporated therein. For example, if it is desired to use the instrument at relatively close ranges, such as within fifty or a hundred feet, lens 32 should be so chosen and controlled as to cause each image of reticle 30 to be within said range. In this case means should preferably be provided for altering the distance between reticle 30 and lens 32 in order to provide for proper focus. It should also be pointed out that if a lens system is added to the instrument, it should preferably be added in such a way that it will affect the reticle system and field system equally in order to compensate for errors.

The above described embodiment of the range finder of the present invention may be modified in many ways without in any way departing from the scope of the invention. For example, instead of using a crystal of calcite at 34, there may be substituted another suitable double-image-forming element, such for example as a conventional Wollaston or Rochon prism or the like. Any further modification of the optical system which may be necessitated by such change will be apparent to those skilled in the art.

Figs. 8 and 9 illustrate diagrammatically another suitable arrangement for controlling the apparent motion of the stereoscopic indicia. In Fig. 8, element 60 represents any suitable incandescent bulb or other lamp, and element 62 represents a reticle which may comprise an opaque plate having the outline of a diamond etched thereon in such manner as to transmit light from lamp 60. Elements 64 and 65 may correspond to elements 34 and 35 in Fig. 2, and similarly represent double-image-forming means such as a crystal 64 of calcite in combination with a quarter-wave plate 65, the principal vibration direction of said quater-wave plate bisecting the angle between the axes of element 64. Elements 66 and 68 represent, respectively, a similar quarter-wave plate and calcite crystal so positioned with respect to their axes and the axes of elements 64 and 65 as to resolve the two circularly polarized beams transmitted by element 65 into two linearly polarized beams of opposite polarization characteristics. Element 70 represents a third quarter-wave plate adapted to reconvert said linearly polarized beams into circularly polarized beams of opposite polarization characteristics. Lens 72 is the equivalent of lens 32 in Fig. 2, and elements 74 represent circular polarizers corresponding to elements 42 in Fig. 2. Elements 64 and 65 are assembled or connected for rotation together, and elements 66, 68 and 70 are similarly connected for rotation together but in a direction opposite to that of elements 64 and 65.

The operation of this embodiment of the invention is illustrated diagrammatically in Fig. 9. As elements 64 and 65 rotate in one direction while at the same time elements 66 and 68 rotate in the opposite direction, the effect is to cause the two images of reticle 62 to rotate with respect to each other on axes parallel to the axis of the system. However, the eye is unable to detect the vertical movement of the two images, and the only movement apparent is their relative lateral movement, although it is immaterial to the operation of the device if the eye does detect said vertical movement. The net result of the operation of this embodiment of the invention is that the two images of reticle 62 change from their positions of maximum relative displacement indicated at AA' in Fig. 9 and corresponding to Fig. 4 through the intermediate positions indicated generally at BB' in Fig. 9 to the position indicated at CC' at which they are substantially superimposed and which corresponds to Fig. 7. Thus, as was explained above in connection with Figs. 4–7, if images A, B and C are visible only to the right eye of the observer and images A', B' and C' are visible only to his left eye, in the position AA' the stereoscopic image of reticle 62 will appear at its shortest distance from the range finder, and in the position CC' it will appear at its maximum distance from the instrument. It will also be understood that if elements 64 and 65 are each mounted for 180° of rotation, the two reticle images will continue their relative movement until their positions will be exchanged from the position AA' in Fig. 9. As explained above in connection with Figs. 2–7, this arrangement may be coupled with suitable relative tilting of the mirrors of the instrument to provide a more sensitive scale.

One of the principal advantages of the above described system is that it makes possible the use of reticles of virtually any design, whereas the first described embodiment of the invention is limited to a straight-line reticle or similar device of uniform size and shape throughout its length. It should be pointed out that the reason for the inclusion in the system of quarter-wave plate 70 and circular polarizers at 74 is that otherwise rotation of elements 68 would produce corresponding rotation of the planes of vibration of the two linearly polarized beams transmitted thereby, which would make virtually impossible proper separation at the eyepieces.

Fig. 10 shows diagrammatically another arrangement for obtaining results comparable to those produced by means of the arrangement shown in Figs. 8 and 9. Lamp 80, reticle 82 and lens 84 correspond to elements 60, 62 and 72, respectively, in Fig. 8. Elements 85 represent a pair of wedge-shaped prisms mounted in any suitable way for rotation in opposite directions, and elements 86 represent eyepieces similar to elements 26 in Figs. 1 and 2. It will be seen that with this arrangement each eye of the observer will see a separate image of reticle 82 through one of the two wedges 85, and that as wedges 85 rotate through 180 degrees from the position represented in Fig. 10, the image seen by each eye will rotate in the same manner, as is illustrated in Fig. 9. Thus, the stereoscopic image seen by the observer will appear to move in space in the same manner as with the apparatus shown in Fig. 8. With the eye positions of the observer fixed by means of eyepieces 86, it may be unnecessary to provide any other means for insuring that each eye sees only a single image of reticle 82, although this result may be further insured, if desired, by the inclusion in the system of a suitable septum 88.

Figure 1:
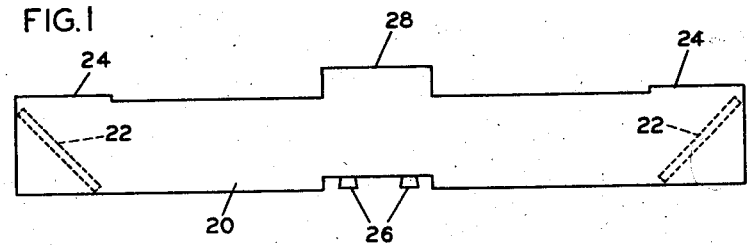
Figure 1 is a plan view of the housing of a range finder constituting an embodiment of the invention.

It should be understood that all of the above described embodiments of the invention are given by way of illustration only, and that they may be further modified to a considerable degree without departing from within the scope of the invention. To a considerable extent the construction of the range finders of the invention is determined by the purpose for which they are intended. For example, mirrors 22 and 25 are used as illustrated in Figs. 1 and 2 for the purpose of increasing the range of the instrument and its accuracy at increased ranges. However, this construction may be modified if the instrument is designed for use at relatively shorter ranges, i. e. in the order of one hundred yards or less. For such short ranges it may be desirable to rely only upon the human interocular, and Fig. 11 illustrates diagrammatically a further modification of the invention suitable for such uses. One eye of the observer is indicated at 90 as viewing the field through a single transparent mirror 92, and the reticle system comprises light source 94, double-image-forming element 95, mask 96, lens 98 and a pair of analyzers 99, one for each eye of the observer, Many other modifications will doubtless be apparent to those skilled in the art, and are to be construed as coming within the scope of the invention.

Throughout the specification and claims the term "circular polarization," or its equivalent, shall be deemed to include polarization in which the degree of ellipticity so closely approximates true circular polarization that double-imaging in the optical systems described is negligible.

Since certain changes may be made in the above device and different embodiments of the invention could be made without departing from its scope, it is intended that all matter contained in the above description or shown in the accompanying drawings shall be interpereted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. In a range finder, a reticle, means for forming laterally spaced, differently polarized, left-eye and right-eye images of said reticle, means for superimposing said images upon the field of view of said device, and means comprising light-polarizing elements for substantially blocking from each eye of an observer that image intended to be seen by the other eye.

2. In a range finder, a reticle, means for forming laterally spaced, oppositely circularly polarized, left-eye and right-eye images of said reticle, means for superimposing said images upon the field of view of said device, and means comprising circular polarizers for substantially blocking from each eye of an observer that image intended to be seen by the other eye.

3. In a range finder, in combination, means for increasing the effective interocular of an observer, a reticle, means for forming differently polarized left-eye and right-eye images of said reticle, means for superimposing said images upon the field of view, means comprising light-polarizing elements for substantially blocking from each eye of an observer that image intended to be seen by the other eye, and means for altering the apparent position of said reticle within said field of view.

4. In a range finder, in combination, means for increasing the effective interocular of an observer, a reticle, means comprising a double-image crystal for forming left-eye and right-eye images of said reticle, means for superimposing said images upon the field of view, means for substantially blocking from each eye of an observer that image intended to be seen by the other eye, and means for altering the apparent position of said reticle within said field of view.

5. In a range finder, in combination, means for increasing the effective interocular of an observer, a reticle, means comprising a double-image-forming element and a quarter-wave retardation element for forming oppositely circularly polarized left-eye and right-eye images of said reticle, means for superimposing said images upon the field of view, means comprising a plurality of circular polarizers for substantially blocking from each eye of an observer that image intended to be seen by the other eye, and means for altering the apparent position of said reticle within said field of view comprising means for moving laterally at least one of said images with respect to the other.

6. In a range finder, in combination, means for increasing the effective interocular of an observer, a reticle, means for forming left-eye and right-eye images of said reticle, means for superimposing said images upon the field of view, means for substantially blocking from each eye of an observer that image intended to be seen by the other eye, and means for altering the apparent position of said reticle within said field of view comprising means for moving each of said images laterally, simultaneously and in opposite directions, said last-mentioned means comprising a plurality of oppositely rotatable double-image-forming elements.

7. A range finder comprising, in combination, means providing a plurality of reflecting surfaces and a plurality of transparent mirrors for increasing the effective interocular of an observer, a collimating lens positioned on the far side of said transparent mirrors from said observer and having a diameter at least as large as the actual interocular distance of said observer, an illuminated image-forming element positioned substantially at the focal point of said lens, a double-image crystal and a quarter-wave retardation element positioned to intercept light emanating from said illuminated element and traversing said lens so as to form two differently circularly polarized images of said illuminated element, masking means positioned to block from said observer all save a predetermined portion of each polarized image, a plurality of circularly polarizing analyzers positioned to block from each eye of the observer that image of said illuminated element intended to be seen by the other eye of the observer, means for rotating said double-image crystal and the quarter-wave device associated therewith to alter the lateral displacement of the images formed thereby, and scale means associated with said rotating means for ascertaining the distance from said range finder to the apparent position in the field of view of said illuminated element.

8. A range finder comprising, in combination, means providing a plurality of reflecting surfaces and a plurality of transparent mirrors for increasing the effective interocular of an observer, means comprising an indicia-forming element and a double-image-forming element for providing two identical, differently polarized images of said indicia in the field of view of an observer looking through said transparent mirrors, means for shielding from each eye of the observer that image intended to be seen by the other eye, means for altering the distance horizontally between said images, and measuring means responsive to said last-mentioned means.

9. A range finder comprising, in combination, means providing a plurality of reflecting surfaces and a plurality of transparent mirrors for increasing the effective interocular of an observer, an indicia-forming element and a double-image-forming element for providing two identical, differently polarized images of said indicia in the field of view of an observer looking through said transparent mirrors, means for substantially collimating the light carrying said images, means for shielding from each eye of the observer that image intended to be seen by the other eye, means for altering the distance horizontally between said images, and measuring means responsive to said last-mentioned means.

10. A range finder comprising, in combination, means providing a plurality of reflecting surfaces and a plurality of transparent mirrors for increasing the effective interocular of an observer, an indicia-forming element and a double-image-forming element having mounted for rotation therewith a quarter-wave retardation device for providing two identical, differently circularly polarized images of said indicia in the field of view of an observer looking through said transparent mirrors, means for substantially collimating the light carrying said images, means for shielding from each eye of the observer that image intended to be seen by the other eye, means for altering the distance horizontally between said images, and measuring means responsive to said last-mentioned means.

11. A range finder comprising, in combination, means providing a plurality of reflecting surfaces and a plurality of transparent mirrors for increasing the effective interocular of an observer, an indicia-forming element and a double-image-forming element having mounted for rotation therewith a quarter-wave retardation device for providing two identical, differently circularly polarized images of said indicia in the field of view of an observer looking through said transparent mirrors, means for substantially collimating the light carrying said images, means for shielding from each eye of the observer that image intended to be seen by the other eye, means for shielding from an observer vertical movement of one of said images with respect to the other, means for altering the distance horizontally between said images, and measuring means responsive to said last-mentioned means.

12. A range finder comprising, in combination, means providing a plurality of reflecting surfaces and a plurality of transparent mirrors for increasing the effective interocular of an observer, means comprising a collimating lens, an indicia-forming element and a double-image-forming element for providing two identical, differently polarized images of said indicia in the field of view of an observer looking through said transparent mirrors, means for shielding from each eye of the observer that image intended to be seen by the other eye, means for altering the distance horizontally between said images comprising means for rotating said double-image-forming element about an axis parallel to the axis of said lens, and measuring means responsive to said last-mentioned means.

13. A range finder comprising, in combination, means providing a plurality of reflecting surfaces and a plurality of transparent mirrors for increasing the effective interocular of an observer, means comprising an indicia-forming element and a double-image-forming element for providing two identical, differently polarized images of said indicia in the field of view of an observer looking through said transparent mirrors, means comprising a plurality of light-polarizing elements for shielding from each eye of the observer that image intended to be seen by the other eye, means for altering the distance horizontally between said images, and measuring means responsive to said last-mentioned means.

14. A range finder comprising, in combination, means providing a plurality of reflecting surfaces and a plurality of transparent mirrors for increasing the effective interocular of an observer, an indicia-forming element and a double-image-forming element having mounted for rotation therewith a quarter-wave retardation device for providing two identical, differently circularly polarized images of said indicia in the field of view of an observer looking through said transparent mirrors, means for substantially collimating the light carrying said images, means comprising a plurality of circularly polarizing elements for shielding from each eye of the observer that image intended to be seen by the other eye, means for altering the distance horizontally between said images, and measuring means responsive to said last-mentioned means.

15. In a range finder, a reticle from which unpolarized light is transmitted, means receiving unpolarized light transmitted from said reticle for converting it to polarized light while producing oppositely polarized, right-eye and left-eye images of said reticle, means comprising a plurality of reflecting surfaces and a plurality of transparent mirrors for increasing the effective interocular of an observer and for superimposing said light-polarized reticle images upon the field of view of said device, said transparent mirrors being positioned between said reticle image-producing means and an observer, means for substantially collimating the polarized light forming said reticle images and comprising a lens positioned between said transparent mirrors and said reticle image-producing means, means positioned in the path of the polarized light which forms said reticle images for analyzing said light before it reaches the eye of an observer whereby to block from each eye of the observer that image intended to be seen by the other eye, and means for altering the apparent position of said reticle within said field of view.

16. In a range finder, in combination, means for forming a left-eye image and a right-eye image of an object being ranged, left-eye and right-eye viewing means for observing said left and right-eye object images respectively, means reimaging each object image in the field of its respective viewing means, a reticle, double image-forming means for forming a left-eye image and a right-eye image of said reticle in the field of view of each viewing means, means positioned in the field of view of each viewing means whereby only the left-eye reticle image is observable through the left-eye viewing means and only the right-eye reticle image is observable through the right-eye viewing means, and means for altering simultaneously and by a like amount the apparent position of said reticle within the field of view of each viewing means.

17. In a range finder, in combination, means for forming a left-eye image and a right-eye image of an object being ranged, left-eye and right-eye viewing means for observing said left- and right-eye object images respectively, means reimaging each object image in the field of view of its respective viewing means, a reticle, double image-forming means for forming a left-eye image and a right-eye image of said reticle in the field of view of each viewing means, means positioned in the field of view of each viewing means whereby only the left-eye reticle image is observable through the left-eye viewing means and only the right-eye reticle image is observable through the right-eye viewing means, means for altering simultaneously and by a like amount the apparent position of said reticle within the field of view of each viewing means, and means for determining the distance from said range finder to the apparent position of said reticle as viewed by said viewing means.

18. In a range finder, in combination, means for forming a left-eye image and a right-eye image of an object being ranged, left-eye and right-eye viewing means for observing said left- and right-eye object images respectively, means reimaging each object image in the field of its respective viewing means, a reticle, double image-forming means for forming a left-eye and a right-eye image of said reticle in the field of view of each viewing means, lens means substantially collimating light proceeding from said reticle images and directing said light into each viewing means, means positioned in the field of view of each viewing means whereby only the left-eye reticle image is observable through the left-eye viewing means and only the right-eye reticle image is observable through the right-eye viewing means, and means for altering simultaneously and by a like amount the apparent position of said reticle within the field of view of each viewing means.

19. In a range finder, in combination, a reticle, means for forming a left-eye and a right-eye image of said reticle at least one of which images may be moved laterally with respect to the other on rotation of the reticle image-forming means, means for rotatably mounting said reticle image-forming means, means for increasing the effective interocular of an observer and for superimposing said reticle images upon the field of view, means for substantially blocking from each eye of an observer that reticle image intended to be seen by the other eye, and means for altering the apparent position of said reticle within said field of view comprising means for rotating said reticle image-forming means.

EDWIN H. LAND.